United States Patent [19]
Adams

[11] Patent Number: 5,960,465
[45] Date of Patent: Sep. 28, 1999

[54] APPARATUS AND METHOD FOR DIRECTLY ACCESSING COMPRESSED DATA UTILIZING A COMPRESSED MEMORY ADDRESS TRANSLATION UNIT AND COMPRESSION DESCRIPTOR TABLE

[75] Inventor: Phillip M. Adams, Salt Lake City, Utah

[73] Assignee: Novell, Inc., Provo, Utah

[21] Appl. No.: 08/807,477

[22] Filed: Feb. 27, 1997

[51] Int. Cl.[6] ................................................. G06F 12/10
[52] U.S. Cl. ............................ 711/208; 711/202; 395/888
[58] Field of Search .................................. 711/202, 203, 711/205, 206, 207, 208, 209; 395/888

[56] References Cited

U.S. PATENT DOCUMENTS

| | | | |
|---|---|---|---|
| 4,545,032 | 10/1985 | Mak | 341/90 |
| 4,853,696 | 8/1989 | Mukherjee | 341/65 |
| 5,247,638 | 9/1993 | O'Brien et al | 395/888 |
| 5,254,990 | 10/1993 | Yoshida et al. | 341/51 |
| 5,450,562 | 9/1995 | Rosenberg et al. | 711/119 |
| 5,696,926 | 12/1997 | Culbert et al. | 711/105 |
| 5,696,927 | 12/1997 | MacDonald et al. | 395/888 |
| 5,699,539 | 12/1997 | Garber et al. | 711/202 |

*Primary Examiner*—Glenn Gossage
*Attorney, Agent, or Firm*—Madson & Metcalf

[57] ABSTRACT

A method and apparatus for directly accessing data compressed by a dictionary-based compression scheme are disclosed. The apparatus may include an execution unit for processing data and an address generation unit connected to the execution unit for generating a logical address corresponding to the data. A compressed memory address translation unit operably connected to the address generation unit maps the logical address to a linear address corresponding to a physical address at which the data is stored as compressed data. The compressed memory address translation unit may include comparison elements. Each comparison element is adapted to determine whether an input address is within an address range associated therewith. Each comparison element may further include a map logic circuit for computing the linear address as an offset and a base linear address. One single comparison element uniquely provides the linear address to be output by the compressed memory address translation unit. A memory device may store a compression descriptor table comprising memory descriptors. The compression descriptor table may comprise both local and global tables mapping logical address ranges to physical address ranges within the memory device, with each descriptor including a logical address, a length, and a linear address. Each descriptor relates a unique logical address range (corresponding to a portion of a logical address space), to a physical address range (corresponding to space in the memory device).

21 Claims, 9 Drawing Sheets

APPARATUS AND METHOD FOR DIRECTLY ACCESSING COMPRESSED DATA UTILIZING A COMPRESSED MEMORY ADDRESS TRANSLATION UNIT AND COMPRESSION DESCRIPTOR TABLE

BACKGROUND

1. The Field of the Invention

This invention relates to data compression and, more particularly, to novel systems and methods for directly accessing compressed data in memory where the data has been compressed based on a dictionary-based compression scheme.

2. The Background Art

Technological advances have placed capabilities of the main frame computers of 20 years ago in today's desk-top computers. The heart of a computer is the processor. The processor accomplishes the primary work of a computer by executing instructions and processing data. Often these data and instructions are in either a memory device or a storage device. Usually, a processor can access main memory (primary memory) faster than it can access a storage device (secondary memory). Therefore, it is typical to store data soon to be processed in memory rather than on a storage device.

Technological advances have regularly doubled memory capacity of computers. Large-capacity primary memory in personal computers, coupled with significant processor speed improvements, has been relied upon by new software. Meanwhile, multitudes of software products continue to be developed each year. Many of these are very large software products making greater demands on memory devices.

Large software applications (lengthy executable codes) usually take up more memory than do smaller applications when run on a computer. In all computer systems, the amount of memory is limited. When large programs (applications, executables, products) take the majority of available memory, they may relegate processing data in memory to be stored out to a storage device. When the processor requests the processing data from the storage device, retrieval takes much more time than would retrieval from memory.

Higher memory density of data is desirable. More actual executable code and processing data in memory allows the processor to process faster than resorting to a storage device. To relieve limited memory, many consumers simply buy more. Installing more memory increases capacity, but not efficiency. If available memory were used more efficiently, the same benefits may be achieved without the cost.

Compression of the executables and data stored in memory may store more actual information, increasing efficiency in memory. However, this usually requires additional processing. Typically, the processor compresses the data to be placed in memory, consuming valuable processor time. Decompression schemes typically require the processor to decompress the data from memory as needed. Decompression consumes additional processor time. Thus, although the typical compression schemes effectively provide more memory space, they cost valuable processor time, dynamically compressing and decompressing data with each write to and read from memory.

Moreover, the current techniques require an additional area in memory to store the decompressed data. In other words, these techniques decompress data stored in memory to produce decompressed data. This decompressed data is written to an additional, different area in memory. From this area in memory, the processor may access the decompressed data for use. This approach is necessitated because the compressed data is not directly usable. The compressed data must be first decompressed and stored in decompressed form before it is usable by the processor.

Many methods for compressing memory rely on software level operations to compress the memory. These operations may take additional valuable processor time to execute instructions at all lower levels involved, including the operating system level and hardware level. Certain documentation discloses hardware devices to compress data. These devices typically compress faster than software compression methods. Because they accomplish the compression independently, a processor does not have to. However, these devices are typically not integrated into a computer system's architecture.

BRIEF SUMMARY AND OBJECTS OF THE INVENTION

In view of the foregoing, it is a primary object of the present invention to provide an apparatus and methods for directly accessing and using compressed memory without the aid of an intermediate step or storage buffer.

Another object of the present invention is to conserve memory resources associated with a processor.

A further object is to avoid dynamic compression and decompression of data by a processor when the processor is interfacing with a memory device containing compressed data.

Another object is to provide an apparatus and method for directly accessing compressed memory that may easily be adapted to many different computer-system architectures commonly available.

Still another object of the present invention is to enable systems with limited memory resources to effectively increase their memory capacity without adding more physical memory.

Yet another object is to increase the speed by which data is processed by facilitating the storage of more data in primary memory.

Consistent with the foregoing objects, and in accordance with the invention as embodied and broadly described herein, an apparatus and method for directly accessing compressed memory are disclosed, in one embodiment, for directly accessing data compressed by a dictionary-based compression scheme. An apparatus for directly accessing compressed memory may include an execution unit for processing data, an address generation unit for generating a logical address corresponding to the data, and a compressed memory address translation unit.

The compressed memory address translation unit may map a logical address of data (executable or not) to a linear address. The linear address corresponds to a physical address at which the data is stored as compressed data. The compressed memory address translation unit may rely on comparison elements. Each comparison element determines whether an input address is within the address range associated with that element.

Each comparison element maps, by way of a logic circuit, the linear address as an offset from a base linear address. For a single input address, a single comparison element uniquely provides the resulting linear address to be output by the compressed memory address translation unit.

The apparatus may include a memory device. In the memory device a compression descriptor table contains memory descriptors. Each such descriptor maps a unique logical address range, corresponding to a portion of a logical address space, to a physical address range corresponding to a portion of the addressable memory space of the memory device.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Figure 1:
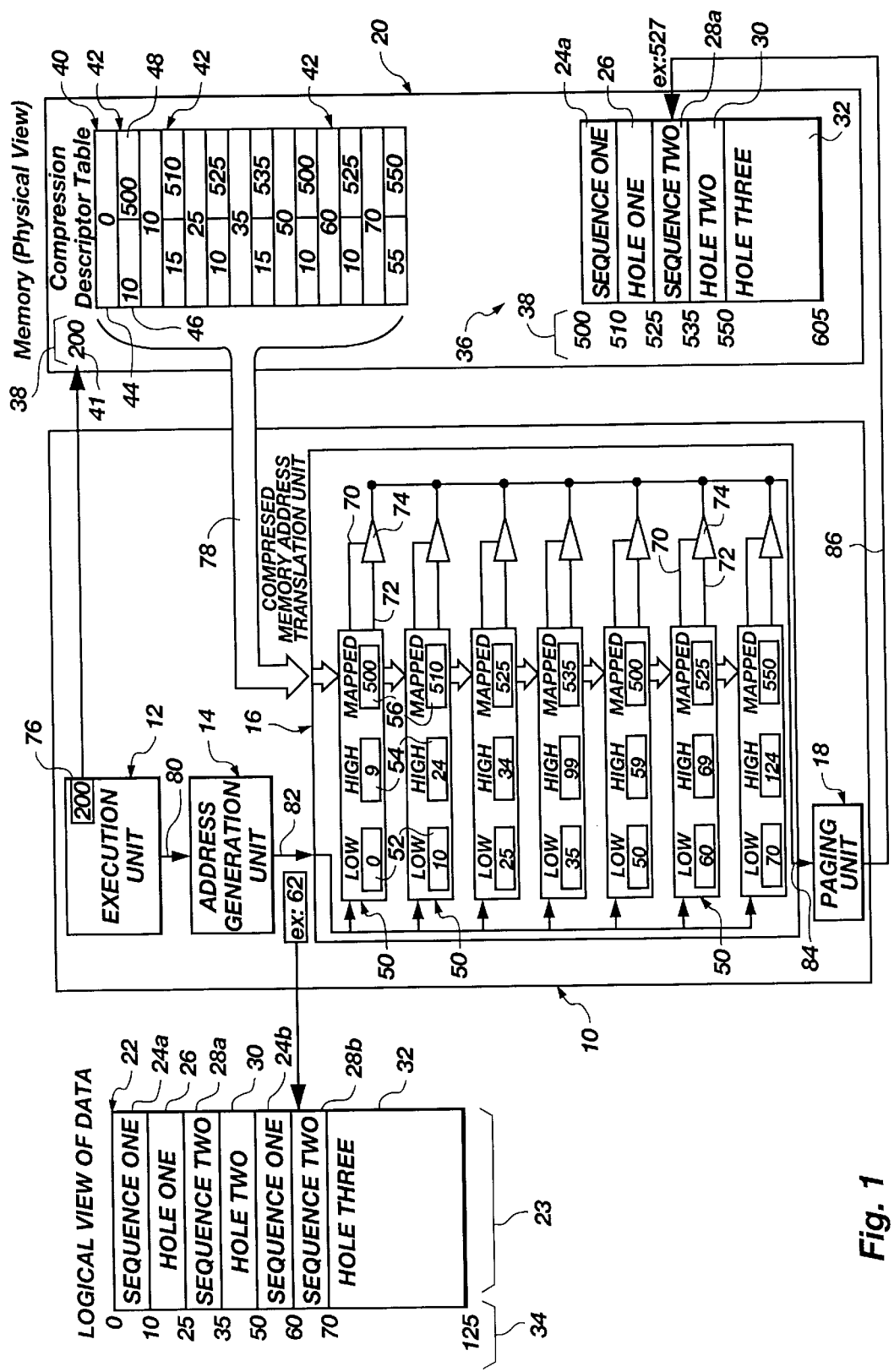
FIG. 1 is a schematic block diagram of a high-level conceptual view of an apparatus, in accordance with the invention, for mapping an address from a logical address space to a linear and physical address space in compressed memory.

One embodiment of an apparatus in accordance with the present invention for directly accessing compressed memory is illustrated in FIG. 1. FIG. 1 reflects a high-level conceptual view of direct compressed memory access. Compressed memory refers generally to primary memory wherein data is stored in a compressed format. Therefore, it will be understood that reference to memory generally means reference to primary memory and not secondary memory (e.g., a storage device). Additionally, caches are not specifically referred to herein because an apparatus in accordance with the present invention may be implemented independent of caches and caching methods.

A processor 10 includes an execution unit 12 for processing data, an address generation unit 14 for generating a logical address 82 corresponding to the data, and a compressed memory address translation unit 16 for mapping the logical address 82 to a linear address 84. The linear address 84 corresponds to a physical address 86 at which the data is stored in a memory device 20. A paging unit 18 may be connected to the compressed memory address translation unit 16 for transforming a linear address 84 into a physical address 86. The paging unit 18 is optional and may not be included in some architectures.

The execution unit 12 performs functions of the processor 10, such as instruction fetching, instruction decoding, arithmetic and logic functions, and the like. The execution unit 12 may typically contain a register file (not shown) containing registers of the processor 10. In addition, the execution unit 12 may also contain an Arithmetic Logic Unit (ALU) (not shown) to perform arithmetic and logic functions. Moreover, the execution unit 12 may provide control for the processor 10. Accordingly, a control unit (not shown) may also be contained in the execution unit 12 as known in the art.

It will be appreciated by one skilled in the art that other components may be required and/or added to the processor 10. An apparatus and methods in accordance with the present invention focus on directly accessing compressed memory regardless of the type of processor involved. Therefore, the specific details with regard to standard components of a processor as known by those skilled in the art are not critical to the invention. For example, a bus interface unit (not shown) is typically required as a component of the processor 10. Furthermore, the processor 10 may contain latches, drivers, transceivers, queues, data lines, control lines, and the like. Independent of most of the details of a processor, an apparatus and methods in accordance with the present invention may be adapted to virtually any type of processor.

For example, the present invention may be adapted to most processors presently designed and marketed by INTEL™, MOTOROLA™, IBM™, and CYRIX™, and others. Details of the processor 10 not directly affected by the operation of a compressed memory address translation unit 16 for directly accessing compressed memory are known by those skilled in the art for various families of processors.

During operation, the processor 10 may be required to process data. To access such data, the execution unit 12 may generate an effective address 80 for the data. The address generation unit 14 is operably connected to the execution unit 12 for processing the effective address 80. As FIG. 1 illustrates, the execution unit 12 may feed the effective address 80 to the address generation unit 14. The address generation unit 14 may use this effective address 80 to generate a logical address 82 corresponding to the effective address 80. The logical address 82 may be the address in the logical address space 22 of the data to be accessed by the processor 10 for processing. The logical address space 22 may also be referred to as a logical view 22 of data. However, as will be discussed in relation to FIG. 2, the address generated by the address generation unit 14 may be in other forms besides a logical address.

The compressed memory address translation unit 16 is operably connected to the address generation unit 14 for mapping a logical address 82 to a linear address 84 corresponding to a physical address 86 of the compressed data in the physical address space 36. If paging is being used, the address generated by the compressed memory address translation unit 16 may be a linear address 84. The paging unit 18 may translate the linear address 84 into a physical address 86. Paging is known by those skilled in the art and is not adversely affected by the invention. Details of the paging unit 18 are not necessary here.

If paging is not used, an address 84 generated by the compressed memory address translation unit 16 may be a physical address 86. If further address translation after the compressed memory address translation unit 16 is not needed before the address is used to access data, then an address may be a physical address. However, if further address translation is performed after the compressed memory address translation unit 16, then the address generated by the compressed memory address translation unit 16 may be a linear address 84 associated with a physical address 86 where the data is found.

The compressed memory address translation unit 16 may map a logical address 82 to a linear address 84 corresponding to a physical address 86 where compressed data is stored. FIG. 1 illustrates how direct access to compressed memory is achieved. A logical view 22 of data is what a programmer sees when programming. As used herein, the term "sequence" refers to a section of data that is repeated. A "hole" refers to a section of data that is not repeated. FIG. 1 illustrates a simple example of data contained in the logical address space 22 having, in increasing logical address order, a sequence one 24a, a hole one 26, a sequence two 28a, a hole two 30, a repeat of sequence one 24b, a repeat of sequence two 28b, and a hole three 32. Sequences and holes will both be referred to as sections 23. Both types of sections 23 are portions of a logical address space 22. Beside the sections 23 are the logical addresses 34 of the sections 23.

In FIG. 1, sequence one 24a and sequence two 28a are repeated in the logical address space 22. Using dictionary-based compression the repeated sequences 24a, 28b may be eliminated by pointing to the previous identical sequences 24a, 28a instead of referring to another copy 24a, 28b of the same sequence. To compress data in the logical view 22 of FIG. 1, one may identify sequences one 24a and two 28a as entries in a dictionary. Accordingly, the subsequent sequence one 24b and sequence two 28b may be eliminated if a mapping facility is used to map repeated sequences (i.e., 24a, 28b) to their initial identical sequence (i.e., 24a, 28a). The compression descriptor table 40 may be relied on for this mapping.

The compression descriptor table 40 contains compressed memory descriptors 42. Each compressed memory descriptor 42 contains information enabling the compressed memory address translation unit 16 to relate logical addresses 34 associated with a logical address space 22 to physical addresses 38. If paging is used, the compressed memory address translation unit 16 may directly relate a logical address 82 to a linear address 84. The linear address 84 is associated with a physical address 86; this translation from linear to physical address may be achieved through the paging unit 18.

Each compressed memory descriptor 42 may include a section logical address 44, a section length 46, and a section mapped linear address 48. The section logical address 44 may refer to a logical address 34 of a section 23 of data. The section length 46 may refer to a length of a section 23 of data identified by a section logical address 44 of that descriptor 42.

The section mapped linear address 48 may be the linear address 84 or physical address 86 of the section 23 of code in a linear address space or physical address space 36. The physical address space 36 may also be referred to as a physical view 36 of data. The information in the compressed memory descriptors 42 enables the compressed memory address translation unit 16 to map logical addresses 34 to linear or physical addresses 38. To enable the compressed memory address translation unit 16 to achieve such a mapping, the information in the compression descriptor table 40 may be loaded, as shown by bus 78, into the compressed memory address translation unit 16.

In one preferred embodiment of an apparatus and methods in accordance with the present invention, there may be a descriptor 42 for each section 23 located in a logical address space 22. For example, FIG. 1 illustrates seven sections 23 of data in a logical address space 22. Accordingly, seven compressed memory descriptors 42 may correspond, one for each section 23. In an alternative embodiment illustrated in FIG. 8, a descriptor 42 may exist for each sequence of data located in the logical address space 22. In this embodiment, a descriptor 42 may typically only be needed for sequences (i.e., 24a, 28a, 24a, 28b), not holes (i.e., 26, 30, 32).

An example of dictionary-based compression of a set of data is illustrated in FIG. 1. A physical view 36 of the data illustrates only one copy of sequence one 24a and of sequence two 28a. In the corresponding logical view 22, two copies of each sequence existed. A compression descriptor table 40 may contain information necessary to map logical addresses 34 into linear addresses associated with physical addresses 38 of data to be accessed. This information may be used by the compressed memory address translation unit 16 to create a mapping function.

The compressed memory address translation unit 16 may include several comparison elements 50. Each may compare an input logical address 82 to a range corresponding to that comparison element 50 and defined by data stored in a compressed memory descriptor 42. For example, each comparison element 50 may contain a low address register 52 (minimum address) and a high address register 54 (maximum address). The low address register 52 and high address register 54 may thus define a range corresponding to a comparison element 50. A comparison element 50 determines whether an input logical address 82 is within the range. The in-range output 70 from a comparison element 50 may indicate whether the input address 82 is within a corresponding range.

Each comparison element 50 may include a mapped linear address register 56 containing the linear address corresponding to a physical address 38 of data in the compressed data in the physical address space 36. If an input logical address 82 is between the values of a low address register 52 and a high address register 54, an input logical address 82 may be mapped using a value contained in the mapped linear address register 56. Each comparison element 50 computes and outputs a computed address output 72. If the input logical address 82 is within the range of a comparison element 50, the logical address 82 requires mapping to the computed address output 72. Accordingly, an in-range output 70 may be provided to a tristate buffer 74 resulting in a computed address output 72. If the input logical address 82 is not within the range of the comparison element 50, then the in-range output 70 may not enable the tristate buffer 74, resulting in the tristate buffer remaining in or entering into a high-impedance state thereby restricting the computed address output 72 from being output as the linear address 84.

For each input logical address 82, the compressed memory address translation unit 16 may output one mapped linear address 84 by operation of all the comparison elements 50. Not more than one in-range output 70 from the comparison elements 50 will find the input logical address 82 to be within its range. Therefore, only one computed address output 72 will be driven through a tristate buffer 74. This one computed address output 72 may be output as the linear address 84. One may think of the compressed memory address translation unit 16 as identifying which section 23 of data the logical address 82 lies within, and mapping a corresponding address to a true, physical location 38 in compressed memory located in the physical address space 36.

If paging is used, the paging unit 18 may map the linear address 84 to a physical address 86. The data to be accessed may actually be found at the physical address 86.

FIG. 1 is illustrative of direct access to compressed memory. Starting from a logical view 22, data to be accessed is shown, for example, as seven sections 23 of data spanning logical addresses 0 to 125 (decimal).

Compressing the data using a dictionary-based compression scheme may first identify repeating sequences of data (i.e., sequence one 24a and sequence two 28a). The data seen in the logical view 22 may be loaded into a memory device 20. The physical view 36 depicts the elimination of repetitions of sequence one 24b and sequence two 28b.

A compressed memory descriptor table 40 may be constructed using address information from the logical view 22 and from the physical view 36. For example, the compression descriptor table 40 of FIG. 1 shows a first compressed memory descriptor 42 identifying sequence one 24a by a section logical address 44 having a value of 0. The section length 46 has a value of 10. The section mapped linear address 48 has a value of 500. The rest of the compressed memory descriptor table 40 shows the composition of other descriptors 42 for mapping the data sections 23.

To initialize the compressed memory address translation unit 16, the execution unit 12 may typically have access to the compression descriptor table 40. The execution unit 12 may have a pointer 76, pointing to the base address 41 (illustrated in FIG. 1 having a physical address 38 of 200) of the compression descriptor table 40. This pointer 76 may be in the form of a hardware register. Alternatively, the base address 41 may be directly or indirectly provided in an instruction to be executed by the processor 10. An instruction may be provided to initialize the compressed memory address translation unit 16 by initiating a transfer, as shown by bus 78, of data from the compression descriptor table 40 in the memory device 20 to the compressed memory address translation unit 16 within the processor 10.

Once the compressed memory address translation unit 16 has been initialized, direct access to compressed memory may be achieved. For example, a logical address 82 may have a decimal value of 62 (pointing to sequence two 28b). The compressed memory address translation unit 16 may take this address as an input logical address 82 and compare it to the ranges defined by the comparison elements 50, determining within which range the logical address 82 lies. In this example, the compressed memory address translation unit 16 may determine that the value 62 lies within the range defined by a low address of 60 and a high address of 69. The computed address output 72 for this comparison element 50 maps the input logical address 82 having a value of 62 to a linear address 84 having a value of 527.

For processors 10 using paging, the linear address 84 (having value of 527) may further be translated into a physical address 86. For example, assume paging is not used, the linear address 84 may be the same as the physical address 86. The physical address 86 (having value of 527) may point to the appropriate data in sequence two 28a. The address (decimal value of 62 in the logical view 22) may be correctly mapped from the second copy of sequence two 28b in the logical view 22 to the initial copy of sequence two 28a in the physical view 36.

FIG. 1 and the foregoing explanations portray a simple example of directly accessing compressed memory. It will be appreciated by those skilled in the art that the simplicity of the example and FIG. 1 presumes many additional details involved in actual operation of a processor 10 as known in the art. The example teaches certain novel concepts involved in one currently preferred embodiment of an apparatus and methods in accordance with the present invention. The example in no way limits the scope of the present invention.

Figure 2:
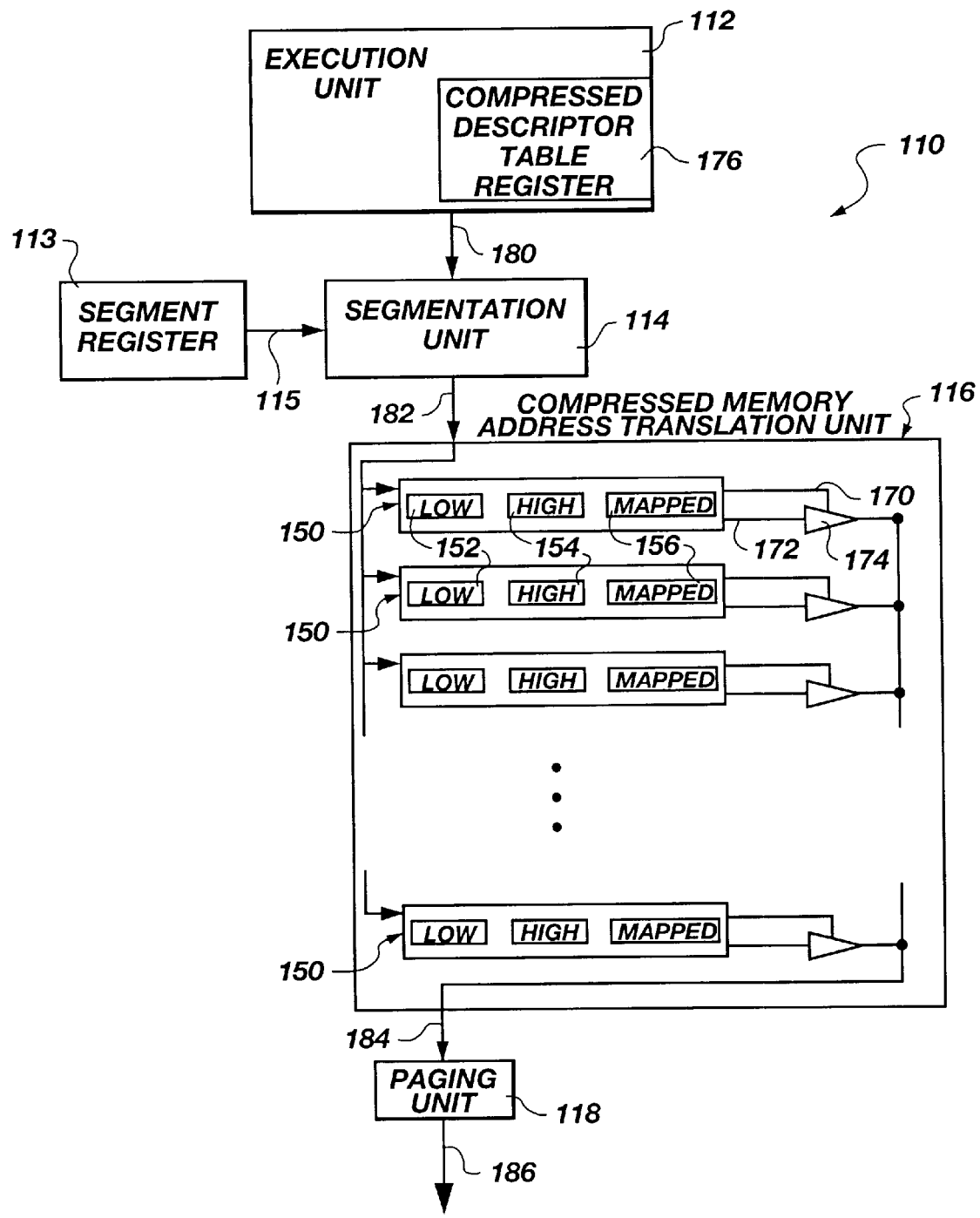
FIG. 2 is a high-level schematic block diagram of the apparatus of FIG. 1 integrated into an INTEL™ based architecture.

Referring now to FIG. 2, an apparatus and methods in accordance with the present invention may be adapted to architectures of a wide variety of processors, including those designed by INTEL™, MOTOROLA™, IBM™, CYRIX™, and the like. For example, FIG. 2 depicts an embodiment implemented within an Intel architecture. As shown, an apparatus 110 adapted to the Intel architecture may include an execution unit 112. The execution unit 112 may generate an effective address 180. A segmentation unit 114 may be associated with the execution unit 112 for translating the effective address 180 into a linear address 182. The segmentation unit 114 may also be associated with a compressed memory address translation unit 116 wherein the compressed memory address translation unit 116 may receive a linear address 182 before compressed memory address translation (compressed memory mapping). A paging unit 118 may be connected to the compressed memory address translation unit 116 for generating a physical address 186 from a linear address 184. Additionally, a processor 110 from the Intel x86 family of processors may include a segment register 113 to contain a selector 115. The selector may point to a descriptor containing information to be used by the segmentation unit 114 in calculating a linear address 182.

The linear address 182 of FIG. 2 is analogous to the logical address 82 of FIG. 1. The expression "linear address" 182 in an Intel architecture maintains consistency with terms used in the art in describing an Intel-compatible processor.

The compressed memory address translation unit 116 of FIG. 2 may operate substantially the same as the compressed memory address translation unit 16 of FIG. 1. The linear address 182, before compressed memory address translation (compressed memory mapping), may be provided to comparison elements 150. Each comparison element 150 may contain a low address register 152, a high address register 154, and a mapped linear address register 156. Like the comparison elements 50, each comparison element 150 may output an in-range output 170 indicating whether the input linear address 182 is within the range of that particular comparison element 150. The in-range output 170 may enable a tristate buffer 174. The tristate buffer may provide a computed address output 172 as an output linear address 184 of the compressed memory address translation unit 116.

A hardware register 176 may be added to the execution unit 112 to point to the compression descriptor table 40. Intel-based architectures typically have a Global Descriptor Table (GDT) and a Local Descriptor Table (LDT). Additionally, a Global Descriptor Table Register (GDTR) and a Local Descriptor Table Register (LDTR) are typically provided as registers pointing to the GDT and LDT, respectively. Consistent with Intel's nomenclature for registers (GDTR, LDTR) pointing to descriptor tables (GDT, LDT), the new hardware register 176 may be referred to as the Compressed memory Descriptor Table Register (CDTR) 176.

Two new instructions may be added to an Intel instruction set to allow the loading and storing of the Compression Descriptor Table Register (CDTR) 176. A Load Compression Descriptor Table (LCDT) command may be provided for loading the CDTR 176. The LCDT instruction may further initiate a transfer of data from the compression descriptor table 40 to the compressed memory address translation unit 116. A Store Compression Descriptor Table (SCDT) command may be provided for storing the CDTR 176.

One additional modification may be useful to minimize reloading the CDTR 176 each time the processor 110 transitions from one privilege level to another. Both a user-mode and systems-mode version of the CDTR 176 may exist. This is analogous to providing both a Global Descriptor Table (GDT) and a Local Descriptor Table (LDT). The GDT is a system-wide, global descriptor table and the LDT is a process-specific, local descriptor table.

Figure 3:
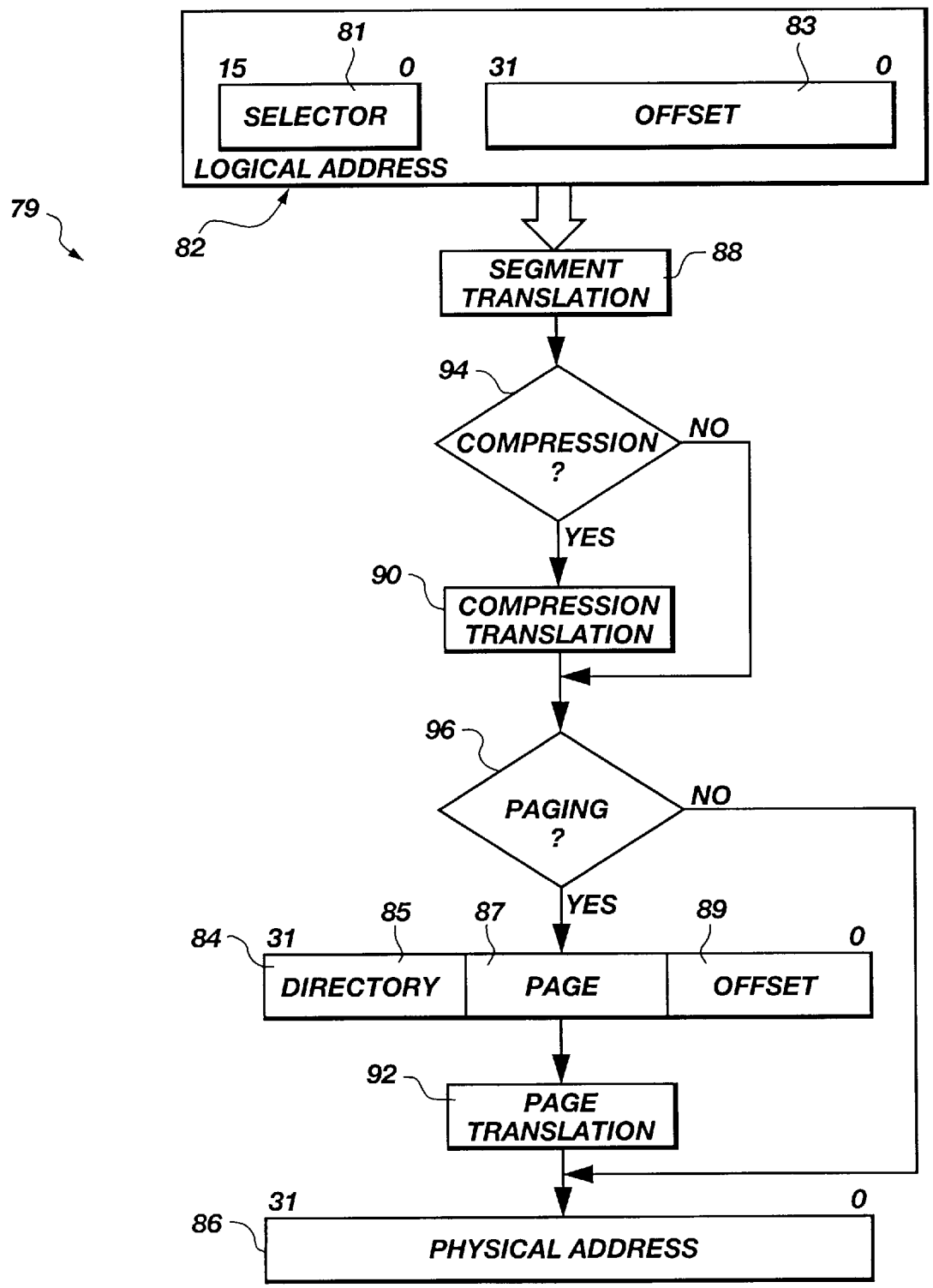
FIG. 3 is a schematic flow diagram of one embodiment of a method implementing an INTEL™-based address translation with compressed-memory mapping.

Referring to FIG. 3, a flow diagram illustrates a process 79 for Intel-based memory addressing with compressed memory mapping. Segment translation 88 may process a logical address 82 containing a selector 81 and an offset 83. An output from a segment translation 88 may be a linear address.

After the segment translation 88, a test, as indicated by 94, determines whether the compressed memory address translation unit is enabled. A positive response, indicating that compressed memory is being used, may advance the process 79 to compression translation 90. A negative response, indicating that compressed data is not being used, may advance the process 79 to a test as indicated by 96, to determine if paging is enabled.

If a paging unit 18 is enabled, a linear address 84 may be used to provide a directory table index 85 which provides the base address of the associated page table. The linear address 84 may also provide a page table index 87 which identifies the associated physical memory page. An offset 89 may be extracted from a linear address 84 to obtain the offset within the selected page, and ultimately access the data at a correct physical address location in memory 20.

Using a directory table index 85, a page table index 87, and a page offset 89 as above may provide a page translation 92 producing a physical address 86. A page translation process 92 need not be affected by the presence of a compressed memory address translation unit 16. Paging may be implemented by virtually any paging method known in the art.

Figure 4:
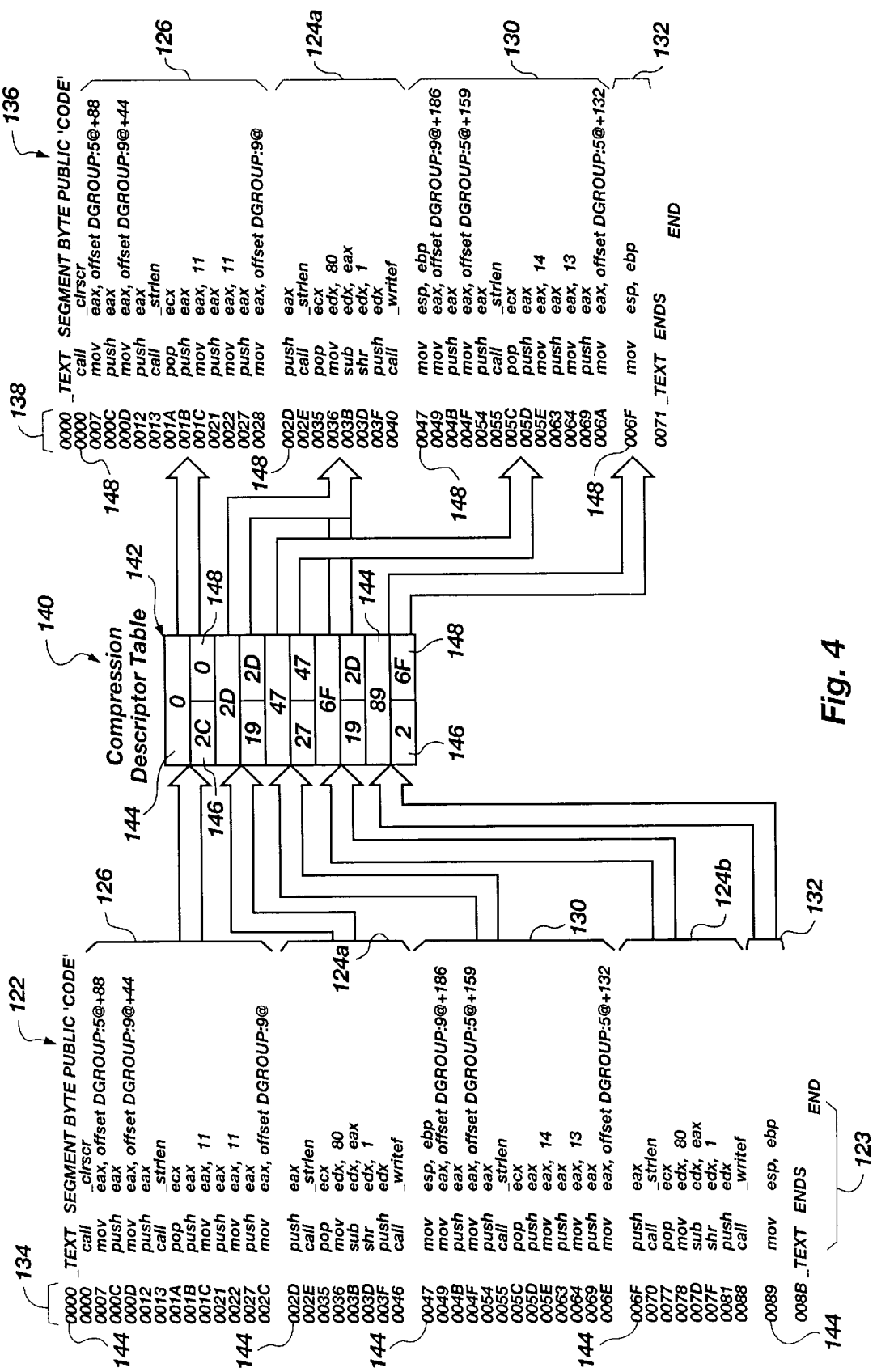
FIG. 4 is a schematic block diagram illustrating an example of dictionary-based compression as applied to programmed assembly instructions and a corresponding compression descriptor table.

Referring to FIG. 4, an example of dictionary-based compression is implemented in programmed assembly instructions of an Intel x86 processor including a corresponding compression descriptor table 140. FIG. 4 includes a logical view 122 of the data (the programmed assembly instructions) as well as a physical view 136 of the data. The format of the code of FIG. 4 is a modified version of a listing file produced by the MICROSOFT™ Macro Assembler Version 6.11.

Certain instructions of FIG. 4 constitute several different sections 123 of data. Logical addresses 134 of the assembly language instructions are shown in hexadecimal format. A dictionary-based compression scheme that may be used in accordance with the principles of the present invention may identify a sequence 124a of data that is repeated. The repetition 124b of this sequence 124a begins at a logical address having a value of 0x6F.

Analyzing the code as the logical addresses 134 increase, a hole one 126 occurs between logical addresses 0x00 and 0x2C. Sequence one 124a begins at a value of 0x2D and ends at a value of 0x46. A hole two 130 occurs from a logical address beginning at a value 0x47 and ending at a value of 0x6E. Another occurrence of sequence one 124b occurs from an address value of 0x6F to a value of 0x88. A hole three 132 occurs from an address value of 0x89 to a value of 0x8B.

The second occurrence 124b of sequence one may be eliminated from the physical view 136 of data by mapping the second occurrence 124b of sequence one to the first occurrence 124a of sequence one. Physical addresses 138 are shown in hexadecimal format. As shown in the physical view 36 of FIG. 4, the data has been compressed by removing a copy 124b of sequence one 124a.

The compression descriptor table 140 may be filled with data corresponding to the logical address 134 and physical address 138 information of the sections 123 of data. The compression descriptor table 140 may contain several compression descriptors 142. Each descriptor may contain a section logical address 144, a section length 146, and a section mapped linear address 148. Section logical addresses 144 are illustrated, both in the compression descriptor table 140 and in the logical view 122 of the data. Additionally, section mapped linear addresses 148 are illustrated both in the compression descriptor table 140 and in the physical view 136 of the data.

Of the descriptors 142, two have the same section mapped linear address 148 having a value of 0x2D. The address 148, in effect, points both sections of sequence one 124a, 124b to one physical copy of sequence one 124a located in the physical view 136 beginning at a physical address 138 having a value of 0x2D.

FIG. 4 represents one practical example of directly accessing compressed memory compressed by a dictionary-based compression scheme. Independent of the particular instructions (code) being accessed, an apparatus and methods in accordance with the present invention may be implemented to access any type of data. An apparatus and method in accordance with the present invention are well adapted for use with data compressed by dictionary-based compression methods.

Figure 5:
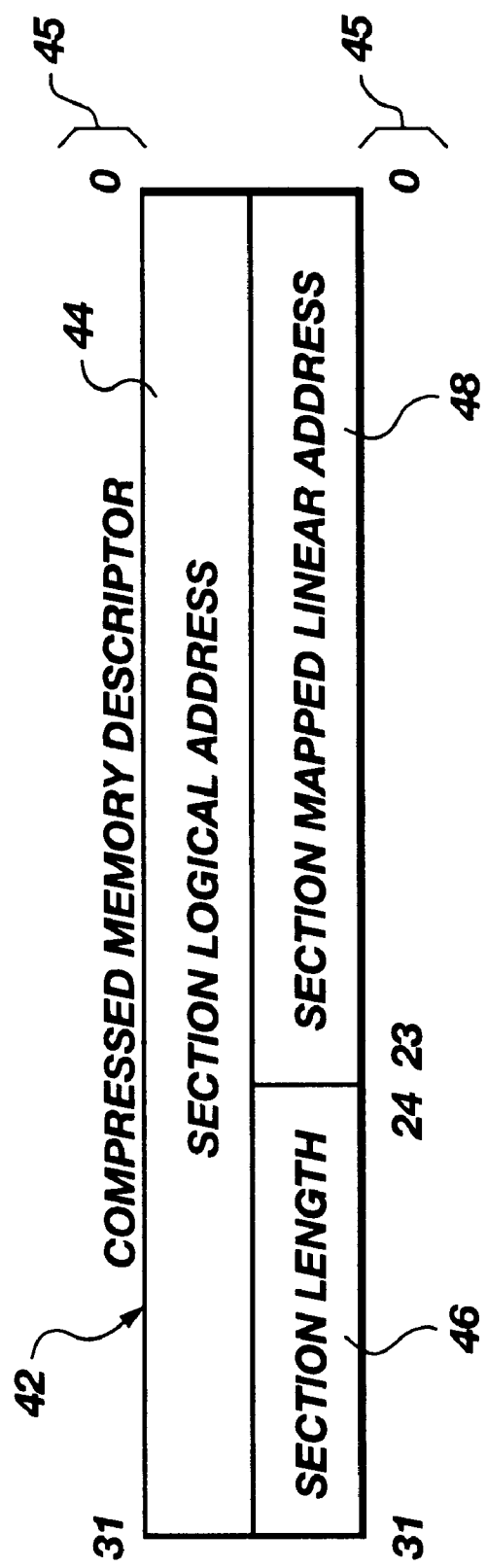
FIG. 5 is a schematic block diagram of one embodiment of a compressed memory descriptor from a compressed memory descriptor table showing certain blocks contained therein and associated lengths used therewith.

Referring to FIG. 5, a compressed memory descriptor 42 is illustrated with indications of bit positions 45 that may be used. Bit positions 45 of descriptors 42 may comport with descriptors used within a processor architecture, such as that of the Intel x86-based family of processors. The bit positions 45 also indicate sizes that may be used with the descriptor 42. The compressed memory descriptor 42 may comprise a section logical address 44, a section length 46, and a section mapped linear address 48.

To match a length used by x86 processors for typical descriptors 42, the compressed memory descriptor 42 may be 8 bytes long. A section logical address 44 may be allocated 32 bits, allowing 4 gigabytes of address range for a section 23 and enabling a section 23 to be located anywhere within a segment (having a size of up to 4 gigabytes).

The section mapped linear address 48 may be 3 bytes long, allowing 16 megabytes of addressable space for the mapped linear address 48. This may require that the original dictionary sequence be within 16 megabytes of a current address. If the 16-megabyte limit becomes a problem, multiple descriptors may be allocated.

A section length 46 may be stored in 1 byte, allowing a section to be up to 256 bytes in length. A resolution or granularity provided by a section maximum length of 256 bytes may be appropriate for most users.

These numbers for sizes of constituents of a compressed memory descriptor 42 are by way of example and not limitation. A descriptor 42 of such a configuration is readily adaptable to an INTEL™ x86-based processor. Many different sizes and configurations of the compressed memory descriptor 42 may be used with Intel-based and other processors and are still within the scope of the present invention. Furthermore, different sizes and configurations of the compressed memory descriptor 42 may be typical with other families of processors, such as, for example, MOTOROLA™, IBM™, CYRIX™, etc.

Figure 6:
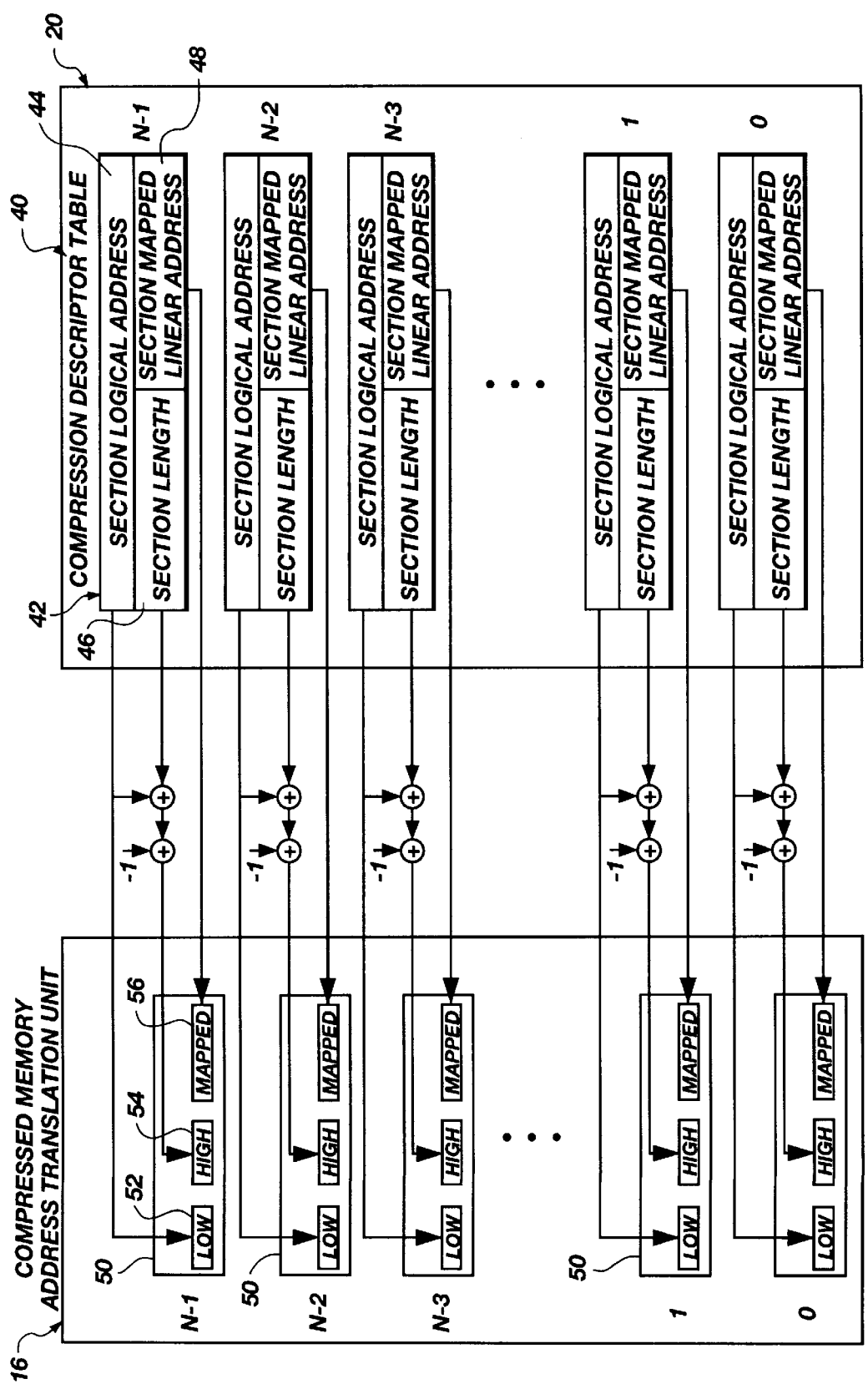
FIG. 6 is a schematic block diagram of one embodiment of a loading process to load comparison elements of a compressed memory address translation unit with information obtained from a compression descriptor table.
Figure 7:
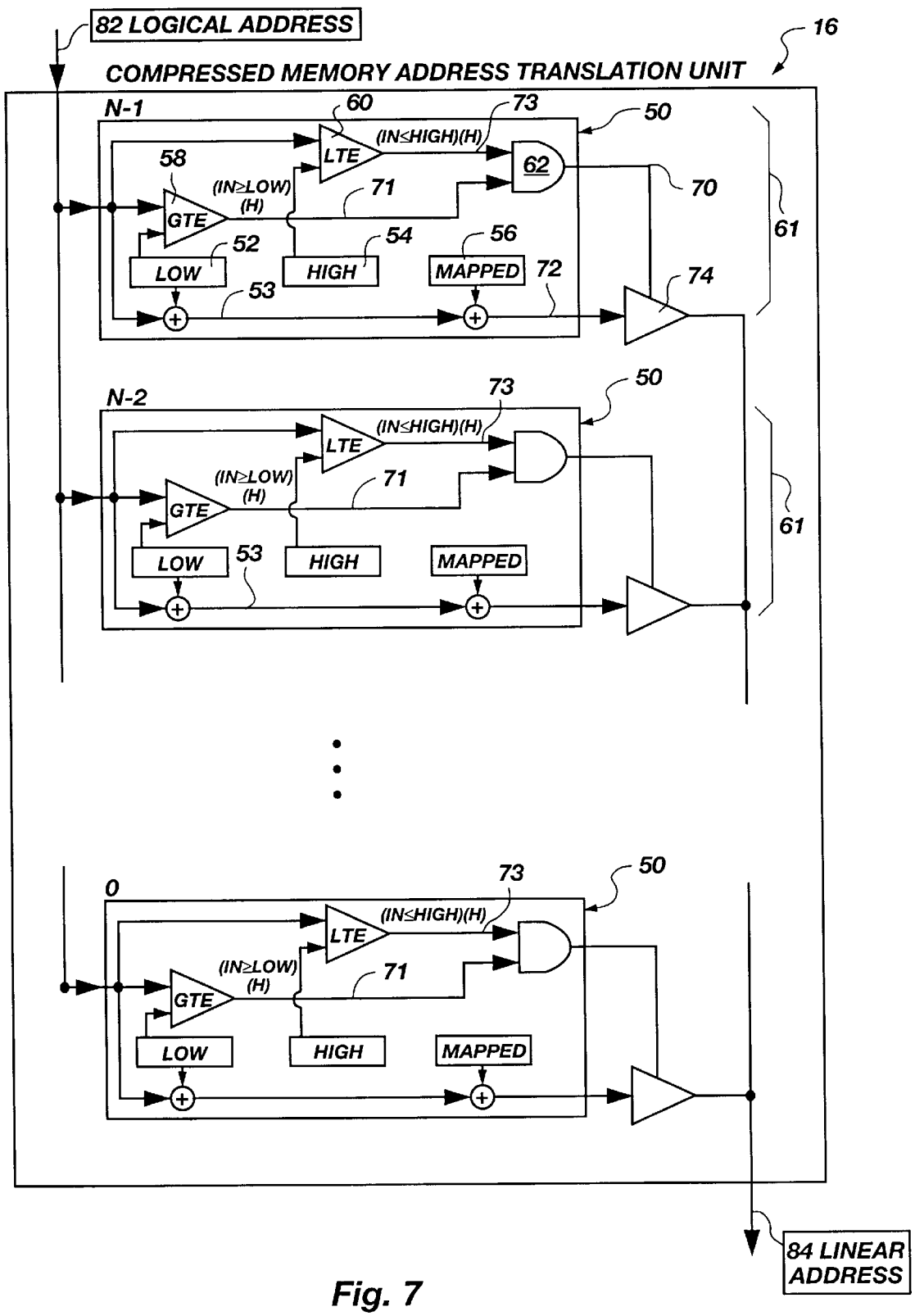
FIG. 7 is a schematic block diagram illustrating one current embodiment of functional operations of comparison elements within a compressed memory address translation unit.
Figure 8:
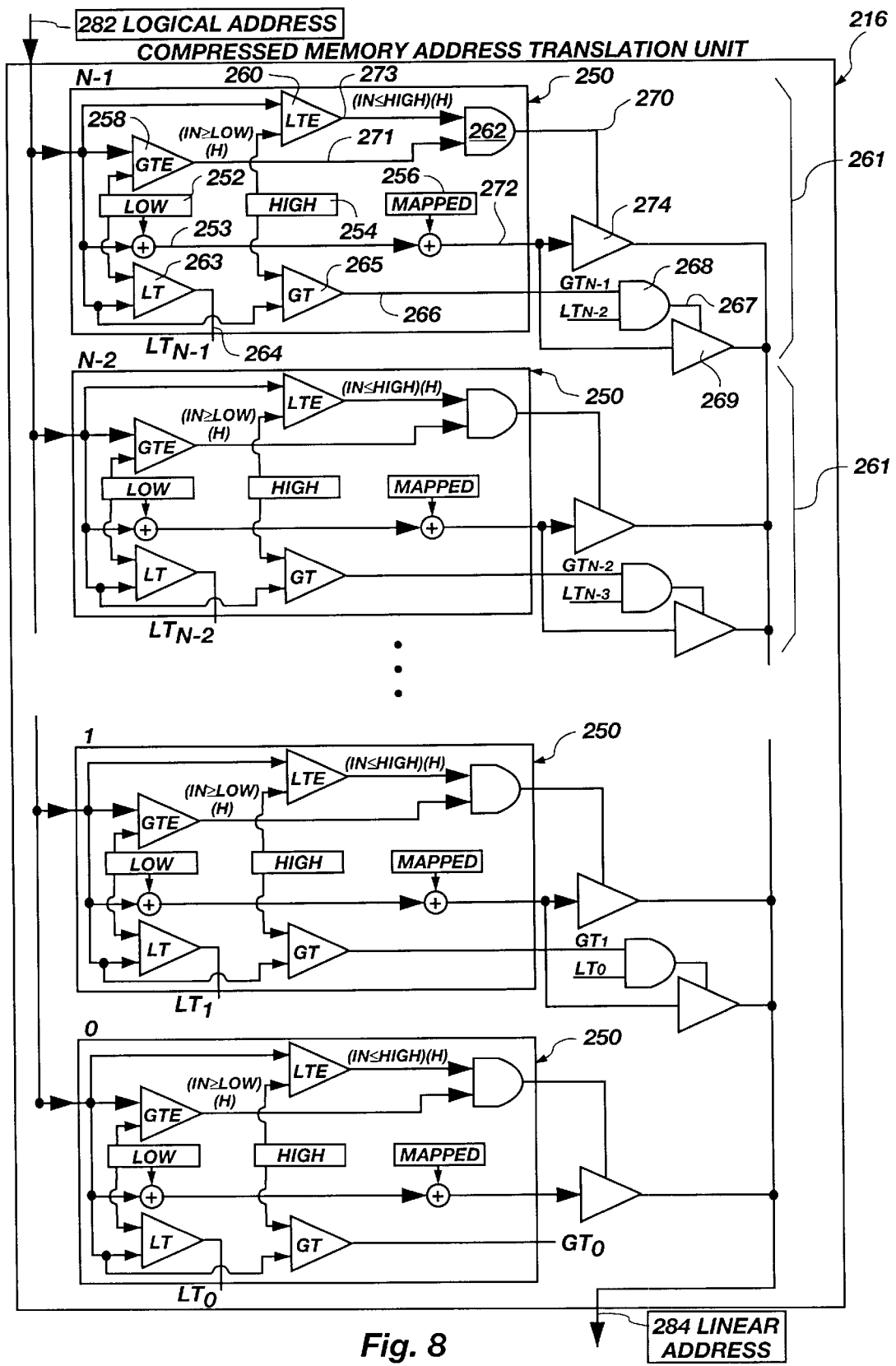
FIG. 8 is a schematic block diagram illustrating another embodiment of functional operations of alternative comparison elements of a compressed memory address translation unit configured to determine whether an input address lies between consecutive, monotonic address ranges defined by consecutive comparison elements.

Referring to FIGS. 6–8, the processor 10 may be programmed to initiate memory transfers from the memory device 20 to the compressed memory address translation unit 16. More specifically, the processor 10 may transfer information contained in the compression descriptor table 40 to the compressed memory address translation unit 16. Information from each descriptor 42 may be transferred into one comparison element 50. The data being transferred may be manipulated to load into the compressed memory address translation unit 16 a new value, the high address register 54.

As shown in FIG. 6, the value from the section logical address 44 field of a descriptor 42 may be transferred directly to the low address register 52 of a comparison element 50. The value in the low address register 52 defines the low endpoint of the range of a particular comparison element 50. The upper endpoint of the range is the low endpoint (low address register 52 value) summed with the section length 46.

Depending on the logic used within each comparison element 50, subtracting one from the summation of the section logical address 44 and section length 46 may be necessary before placing the resultant value in the high address register 54. For example, FIG. 7 depicts a less-than-or-equal-to function being used with the high endpoint of the range. FIG. 6 shows a subtraction of one taking place. When a less-than function is used, a subtraction of one would not be necessary.

FIG. 6 illustrates schematically a calculation of a value to be transferred to the high address register 54 of a comparison element 50. The value from the section mapped linear address 48 field of the descriptor 42 may be transferred to the mapped linear address register 56 of a comparison element 50.

There may be a one-to-one mapping from the active descriptors 42 (active meaning those being used) to the active comparison elements 50, as shown in FIG. 6. As illustrated, N active descriptors 42 (from 0 to N−1), used for a mapping to compressed memory, may require N active comparison elements 50 to facilitate mapping N ranges defined by the descriptors 42 to compressed memory in the physical address space 36.

With reference to FIGS. 1 and 6, initiation of memory transfers by the processor 10 from the memory device 20 to the compressed memory address translation unit 16 may begin upon execution of an instruction to load the base address 41 of the compression descriptor table 40. This base address 41 may be loaded into the pointer 76 located within the execution unit 12.

Alternatively, a direct instruction within the instruction set of the processor 10 may transfer the contents of the compression descriptor table 40 to the compressed memory address translation unit 16. A direct instruction that performs this initialization of the compressed memory address translation unit 16 may include an address of the table 40, or the processor may be configured to automatically use the contents of the pointer 76 to the table 40. A wide variety of ways exist in the art to initiate a memory transfer from the compression descriptor table 40 to the compressed memory address translation unit 16. The approaches mentioned herein are offered by way of example and not limitation.

FIG. 7 illustrates a map logic circuit 61 that may be used within each comparison element 50 of the compressed memory address translation unit 16. A map logic circuit 61 may determine whether an input logical address 82 is within an address range of the comparison element 50. The address range is defined by the values within the low address register 52 and the high address register 54. Each comparison element 50 receives the logical address 82 to compare with the values in the registers 52, 54. The low address register 52 is compared by a greater-than-or-equal-to comparator 58. The resultant output 71 indicates whether the logical address 82 is greater than or equal to the low endpoint 52 of the range of that comparison element 50.

Each comparison element 50 also compares the logical address 82 input with the value in the high address register 54. A less-than-or-equal-to comparator 60 is used in this case. The resultant output 73 indicates whether the logical address 82 is less than or equal to the high endpoint 54 of the range of that comparison element 50.

An AND gate 62 may determine whether the input logical address 82 is within the range of the comparison element 50. The outputs from the greater-than-or-equal-to comparator 58 and the less-than-or-equal-to comparator 60 are ANDed. The result of the AND gate 62 is the in-range output 70. If the in-range output 70 is asserted, the input logical address 82 is within the range and a computed address output 72 from a map logic circuit 61 may be accordingly gated to the output 84 of the compressed memory address translation unit 16.

FIG. 7 shows a functional depiction of a map logic circuit 61 that may be used to compute a linear address 84. The value of the low address register 52 may be subtracted from the input logical address 82 to determine an offset 53 for the address of data to be accessed. This offset 53 may then be added to the value of the mapped linear address register 56 to obtain a computed address output 72. Each comparison element 50 may carry out its own computation of a linear address (computed address output 72). The output 72 (linear address) includes an offset 53 and a base linear address. The base linear address is the value from the mapped linear address register 56.

The in range output 70 from a comparison element 50 may gate the computed address output 72 to the output 84 of the compressed memory address translation unit 16 if the input address 82 lies within the range of that particular comparison element 50. Thus, a single comparison element 50 uniquely provides the one linear address 84 to be output by the compressed memory address translation unit 16 for one input logical address 82.

In the embodiment shown in FIG. 7, each section 23 of data may require its own descriptor 42 within the compression descriptor table 40. Under this approach, each hole and sequence may require an entry in the table 40, as well as a comparison element 50 to accomplish the requisite mapping. However, embodiments may be implemented without such a requirement.

Referring to FIG. 8, a schematic block diagram illustrates the functional operation of an alternative embodiment of the compressed memory address translation unit 216. Similar to the compressed memory address translation unit 16 of FIG. 7, this compressed memory address translation unit 216 includes comparison elements 250 to receive the logical address 282. The logical address 282 is compared with a value in the low address register 252, using a greater-than-or-equal-to comparator 258. Each comparison element 250 also compares the logical address 282 with the value in the high address register 254 using a less-than-or-equal-to comparator 260. An AND gate 262 may determine whether the input logical address 282 is within the range of the comparison element 250 by ANDing the outputs 271, 273 from the greater-than-or-equal-to comparator 258 and the less-than-or-equal-to comparator 260. The result of AND gate 262 is the in-range output 270. The in-range output 270 may be provided to a tristate buffer 274 for gating a computed address output 272 to be output by the compressed memory address translation unit 216 as a linear address 284.

Computation of the computed address output 272 occurs similarly in the embodiment of FIG. 8 to the embodiment of FIG. 7. The value of the low address register 252 may be subtracted from the input logical address 282 to determine an offset 253 for addressing data to be accessed. This offset 253 may then be added to the value of the mapped linear address register 256 to obtain a computed address output 272.

The compressed memory address translation unit 216 may store address information related to sequences in the compression descriptor table 40. Each comparison element 250 has a map and hole logic circuit 261 to determine whether the input logical address 282 lies between consecutive, monotonic address ranges.

Each comparison element 250 may use a less-than comparator 263 to determine whether the input logical address 282 is less than the respective address range defined therein. The less-than range output 264 indicates whether the input logical address 282 is less than the low endpoint (the value in the low address register 252) of the address range.

Each comparison element 250 may further rely on a greater-than comparator 265 to determine whether the input logical address 282 is greater than the respective high endpoint (the value in the high address register 254) of the address range. The greater-than range output 266 indicates whether the input logical address 282 is greater than the high endpoint of the address range.

In the apparatus of FIG. 8, the address ranges of the compressed memory address translation unit 216 are assumed to be monotonically decreasing from the first (0) comparison element 250 to the Nth (N–1) comparison element 250. With this assumption, an AND gate 268 may AND the greater-than range output 266 from the Nth (N–1) comparison element 250 with the less-than range output 264 from the N–1st (N–2) comparison element. Thus, it is determined whether the logical address input 282 lies in between the address ranges of the Nth (N–1) and N–1st (N–2) comparison elements 250. By configuring the ranges of the comparison elements 250 to be monotonically increasing between the first (0) comparison element 250 and the Nth (N–1) comparison element 250, the same determination may be made. An AND gate 268 may AND the greater-than range output 266 from the N–1st (N–2) comparison element 250 with the less-than range output 264 from the Nth (N–1) comparison element. The functional representation of FIG. 8 is by way of example and not limitation.

An assertion from the AND gate 268 indicates that the input logical address 282 lies between the monotonic address ranges. As in the apparatus and method of FIG. 7, a computation may provide a linear address 272 for access to data in a hole. The hole directly follows the sequence defined by the comparison element 250 with the lower address range. This same computation works because the offset 253 will take the address past the range of the sequence and into the hole following. Accordingly, the computed address output 272 may also be gated through the tristate buffer 269 when the output 267 of the AND gate 268 is asserted.

The above logic relies on the fact that no more than one hole (e.g., 26, 30, 32) may directly follow a sequence. Successive, consecutive holes may be effectively treated as a single hole, which is the aggregate of the holes present. The map and hole logic circuit 261, in combination with the comparison elements 250, locates the holes by locating adjacent sequences and allowing the offset 253 to extend into the hole. In order to effectively locate a hole that may be at the beginning of data in the logical view 22, one descriptor 42 and comparison element 250 may be reserved to identify a first section of data, whether a sequence or a hole. If the address ranges are monotonically increasing from the first (0) comparison element 250 to the Nth (N–1) comparison element 250, one descriptor 42 and comparison element 250 may be reserved to identify the last section of data, whether it is a sequence or a hole.

In the embodiment illustrated in FIG. 8, only one comparison element 250 provides the linear address 284 to be output by the compressed memory address translation unit 216.

Figure 9:
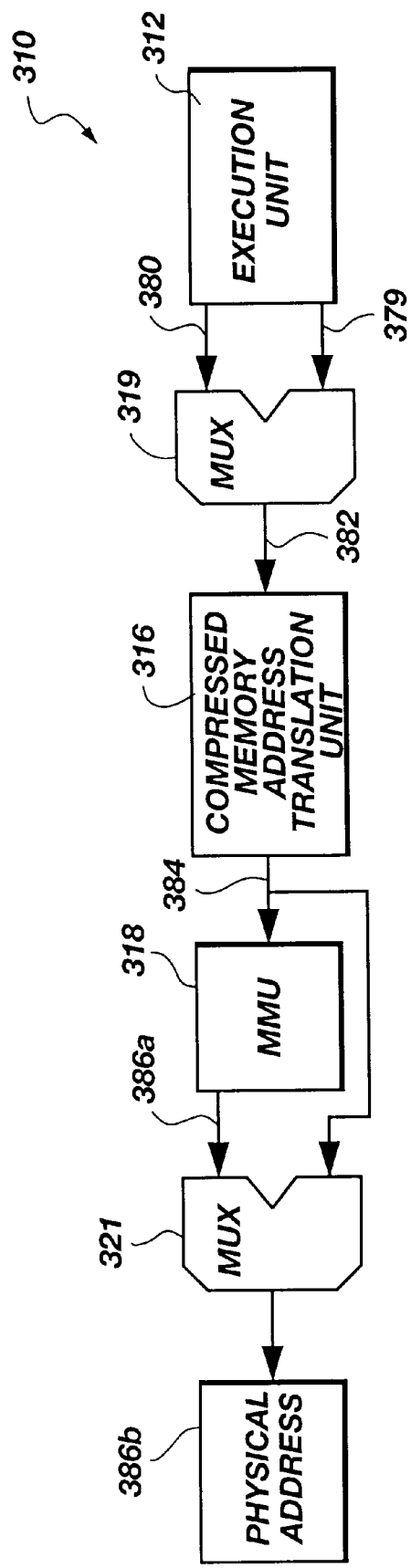
FIG. 9 is a high-level schematic block diagram of the apparatus of FIG. 1 integrated into a MOTOROLA™-based architecture.

Referring now to FIG. 9, an apparatus in accordance with the present invention may be adapted to a MOTOROLA™ 68000-based architecture. As shown, an apparatus 310 adapted to the MOTOROLA™ architecture may include an execution unit 312. A compressed memory address translation unit 316 may be associated with the execution unit 312 for compressed memory address translation (compressed memory mapping). The compressed memory address translation unit 316 may feed a mapped logical address 384 to a Memory Management Unit (MMU) 318 wherein the logical address 384 may be translated into a physical address 386a. The execution unit 312 may be operably connected to the compressed memory address translation unit 316 through a multiplexer (MUX) 319. MUX 319 is a 2-to-1 multiplexer taking as input a data address 379 and an instruction address 380. The MUX 319 outputs a logical address 382 to the compressed memory address translation unit 316.

The compressed memory address translation unit 316 may operate similarly to the compressed memory address translation unit 16 of FIG. 1. The compressed memory address translation unit 316 maps the input logical address 382 into a mapped logical address 384. The mapped logical address 384 may be output to MMU 318 and output into a MUX 321.

The MMU 318 may translate the mapped logical address 384 into a physical address 386*a*. If the MMU 318 is not needed to translate the address 384, the MUX 321 may receive the logical address 384 from the compressed memory address translation unit 316 bypassing the MMU 318.

The MUX 321 outputs a physical address 386b that may be placed on the address bus (not shown) for use in accessing compressed memory.

From the above discussion, it will be appreciated that the present invention provides an apparatus and method for directly accessing compressed memory enabling the conservation of memory resources associated with a processor. The conservation of memory resources effectively enables computer systems to increase memory capacity without adding more memory. A processor accessing compressed data may avoid dynamic compression and decompression of data. As illustrated and described, an apparatus and methods in accordance with the present invention may easily be adapted to various computer system architectures.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for executing directly compressed data, the apparatus comprising:

an execution unit for processing data;

an address generation unit operably connected to the execution unit for generating a logical address corresponding to the data; and a compressed memory address translation unit operably connected to the address translation unit to map the logical address to a linear address corresponding to a physical address at which the data is stored as compressed data;

a memory device to store the compressed data to which the physical address corresponds, wherein the memory device further contains a compression descriptor table comprising memory descriptors, each relating a unique logical address range, corresponding to a portion of a logical address space, to a physical address range in the memory device; and wherein the execution unit is programmed to access and execute on the compressed data directly from the physical address thereof.

2. The apparatus of claim 1, wherein the compressed memory address translation unit comprises a map logic circuit for computing the linear address as an offset and a base linear address.

3. The apparatus of claim 1, wherein the memory address translation unit comprises a plurality of comparison elements for comparing the logical address to an input address, and in which a single comparison element uniquely provides the linear address to be output by the compressed memory address translation unit.

4. The apparatus of claim 1, wherein the memory device further contains the linear address relating the logical address range to the physical address range.

5. The apparatus of claim 4, wherein the memory device further contains a compression descriptor table register storing a base address associated with the compression descriptor table.

6. The apparatus of claim 1, wherein the execution unit, address generation unit, and the compressed memory address translation unit are contained in a processor.

7. The apparatus of claim 6 wherein the memory device also contains the data to which the logical address corresponds.

8. The apparatus of claim 6, wherein the processor is configured to initialize the compressed memory address translation unit.

9. The apparatus of claim 8 wherein the processor is programmed to initiate memory transfers from the memory device to the compressed memory address translation unit upon execution of an instruction to load the contents of the compression descriptor table register.

10. The apparatus of claim 1, wherein the compressed memory address translation unit comprises a comparison element for comparing the logical address to an input address.

11. The apparatus of claim 10, wherein the comparison element is adapted to determine whether an input address is within the address range associated with the comparison element.

12. The apparatus of claim 11, wherein the comparison element is further adapted to determine whether the input address is greater than the address range and whether the input address is less than the address range.

13. The apparatus of claim 12, wherein the memory address translation unit comprises:

a plurality of comparison elements each having an address range associated therewith; and a map and hole logic circuit adapted to determine whether the input address lies between consecutive address ranges of the address ranges.

14. A computer readable memory device comprising a storage medium having data structures supporting direct access to compressed data by a processor operably connected to a memory device, the memory device comprising:

a memory element storing compressed data, compressed by a dictionary-based compression;

a memory element storing a compression descriptor table relating logical address ranges associated with a logical address space to physical address ranges within the memory device; and a memory element storing an executable, executable by the processor to initialize a compressed memory address translation unit in the processor for directly executing the compressed data.

15. The memory device of claim 14, wherein the memory device further comprises a memory element storing:

a loading executable to load a base address associated with the compression descriptor table into a compression descriptor table register in the processor.

16. The memory device of claim 14 wherein the compression descriptor table comprises a plurality of descriptor data structures, each including a logical address, a length, and a linear address.

17. The memory device of claim 16, wherein each logical address corresponds to a logical location at which a section of data occurs, each length corresponds to the length of a corresponding section of data; and each linear address corresponds to a physical location at which a unique copy of a corresponding section of data is stored in the compressed data.

18. The memory device of claim 14, wherein the compression descriptor table comprises:

a local table mapping local logical address ranges to local physical address ranges within the memory device; and a global table mapping global logical address ranges to global physical address ranges within the memory device.

19. The memory device of claim 18, wherein the local and global tables each comprise a plurality of descriptor data structures, each including a logical address, a length, and a linear address.

20. A method for directly accessing, by a processor, compressed data in a memory device, the method comprising:

storing compressed data, compressed by dictionary-based compression, at a physical address, the compressed data corresponding to original data;

relating, by use of a compression descriptor table, a logical address space to a physical address space in a memory device;

computing a logical address;

mapping the logical address to the physical address using the compression descriptor table; and executing the original data at the physical address.

21. The method of claim 20, wherein the mapping step comprises:

mapping the logical address to a linear address; and mapping the linear address to the physical address.

* * * * *